(12) United States Patent
Choi et al.

(10) Patent No.: US 11,958,037 B2
(45) Date of Patent: Apr. 16, 2024

(54) METHOD OF PREPARING SUPERABSORBENT POLYMER

(71) Applicant: LG Chem, Ltd., Seoul (KR)

(72) Inventors: Jinuk Choi, Daejeon (KR); Yesol Yang, Daejeon (KR); Sanghwa Lee, Daejeon (KR); Gicheul Kim, Daejeon (KR); Ki Hyun Kim, Daejeon (KR); Seul Ah Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 850 days.

(21) Appl. No.: 16/981,874

(22) PCT Filed: Dec. 12, 2019

(86) PCT No.: PCT/KR2019/017618
§ 371 (c)(1),
(2) Date: Sep. 17, 2020

(87) PCT Pub. No.: WO2020/145533
PCT Pub. Date: Jul. 16, 2020

(65) Prior Publication Data
US 2021/0094017 A1    Apr. 1, 2021

(30) Foreign Application Priority Data

Jan. 11, 2019   (KR) .......................... 10-2019-0004155

(51) Int. Cl.
| | |
|---|---|
| *B01J 20/26* | (2006.01) |
| *C08F 2/44* | (2006.01) |
| *C08F 220/06* | (2006.01) |
| *C08F 236/20* | (2006.01) |
| *C08J 3/12* | (2006.01) |
| *C08J 3/24* | (2006.01) |
| *C08J 9/14* | (2006.01) |
| *C08K 5/01* | (2006.01) |
| *C08K 9/10* | (2006.01) |
| *C08L 33/08* | (2006.01) |

(52) U.S. Cl.
CPC ........... *B01J 20/267* (2013.01); *B01J 20/261* (2013.01); *C08F 2/44* (2013.01); *C08F 220/06* (2013.01); *C08F 236/20* (2013.01); *C08J 3/12* (2013.01); *C08J 3/24* (2013.01); *C08J 9/14* (2013.01); *C08K 5/01* (2013.01); *C08K 9/10* (2013.01); *C08L 33/08* (2013.01); *B01J 2220/68* (2013.01); *C08L 2207/53* (2013.01)

(58) Field of Classification Search
CPC ........ B01J 20/26; B01J 20/267; B01J 20/261; B01J 2220/68; C08F 2/44; C08F 220/06; C08F 236/20; C08J 3/12; C08J 3/24; C08J 9/14; C08K 5/01; C08K 9/10; C08L 33/08; C08L 2207/53
USPC ......................................................... 502/402
See application file for complete search history.

(56) References Cited

U.S. PATENT DOCUMENTS

| | | |
|---|---|---|
| 2005/0137546 A1 | 6/2005 | Joy et al. |
| 2008/0140035 A1 | 6/2008 | Gadzik et al. |
| 2009/0191408 A1 | 7/2009 | Tian et al. |
| 2012/0001122 A1 | 1/2012 | Wattebled et al. |
| 2014/0114035 A1 | 4/2014 | Nogi et al. |
| 2016/0096944 A1 | 4/2016 | Wattebled et al. |
| 2016/0361704 A1 | 12/2016 | Won et al. |
| 2019/0071523 A1 | 3/2019 | Kim et al. |
| 2021/0163693 A1 | 6/2021 | Yoon et al. |

FOREIGN PATENT DOCUMENTS

| | | |
|---|---|---|
| CN | 102361653 A | 2/2012 |
| CN | 104379647 A | 2/2015 |
| CN | 105524206 A | 4/2016 |
| CN | 107822779 A | 3/2018 |
| CN | 108779198 A | 11/2018 |
| CN | 108779266 A | 11/2018 |
| EP | 3406652 A1 | 11/2018 |
| JP | 3439230 B2 | 8/2003 |
| JP | 2007514833 A | 6/2007 |
| JP | 2008522003 A | 6/2008 |
| JP | 5635685 B2 | 12/2014 |
| KR | 20120043165 A | 5/2012 |
| KR | 20160010516 A | 1/2016 |
| KR | 20160056326 A | 5/2016 |
| KR | 20180043143 A | 4/2018 |
| WO | 2006062609 A2 | 6/2006 |

OTHER PUBLICATIONS

International Search Report for Application No. PCT/KR2019/017618 dated Apr. 9, 2019, 3 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.
Search Report dated Apr. 2, 2022 from Office Action for Chinese Application No. 201980019810.2 dated Apr. 11, 2022.
Extended European Search Report including Written Opinion for Application No. 19908496.3 dated Oct. 4, 2021, pp. 1-7.

*Primary Examiner* — Edward M Johnson
(74) *Attorney, Agent, or Firm* — Lerner David LLP

(57) ABSTRACT

A method of preparing a superabsorbent polymer having a rapid absorption rate and an improved water retention capacity by additional heat treatment while using a thermally degradable internal crosslinking agent and an encapsulated foaming agent at the same time during polymerization.
A superabsorbent polymer prepared by this method is also provided, the superabsorbent polymer having a centrifuge retention capacity (CRC) of 40 g/g to 55 g/g, as measured according to EDANA method WSP 241.3, and an absorption rate of 48 sec or less, as measured by a vortex method.

11 Claims, No Drawings

METHOD OF PREPARING SUPERABSORBENT POLYMER

CROSS-REFERENCE TO RELATED APPLICATIONS

The present application is a national phase entry under 35 U.S.C. § 371 on International Application No. PCT/KR2019/017618, filed Dec. 12, 2019, which claims priority from, Korean Patent Application No. 10-2019-0004155, filed on Jan. 11, 2019, the disclosures of which are hereby incorporated by reference herein in their entirety.

FIELD OF THE INVENTION

The present invention relates to a method of preparing a superabsorbent polymer. More particularly, the present invention relates to a method of preparing a superabsorbent polymer having a rapid absorption rate and an improved water retention capacity.

BACKGROUND OF THE INVENTION

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used for water retaining soil products for gardening, water stop materials for the civil engineering and construction, sheets for raising seedling, fresh-keeping agents for food distribution fields, materials for poultice or the like.

These superabsorbent polymers are the most widely used in the fields of sanitary materials such as diapers, sanitary pads, etc. In the sanitary materials, the superabsorbent polymer is generally distributed throughout pulp. Recently, continuous efforts have been made to provide sanitary materials such as diapers having a thinner thickness, etc., and as part of that, diapers having a reduced content of pulp, and furthermore, diapers having no pulp, so-called pulpless diapers, are actively under development.

Such a sanitary material having a reduced content of pulp or having no pulp includes the superabsorbent polymer at a relatively high ratio. In this case, the superabsorbent polymer particles are inevitably included as multiple layers in the sanitary materials. In order to allow superabsorbent polymer particles included as multiple layers to more efficiently absorb a liquid such as urine, it is necessary for the superabsorbent polymer to basically exhibit high absorption performance and absorption rate.

To this end, a method of decreasing a degree of internal crosslinking and increasing a degree of surface crosslinking of the superabsorbent polymer has been traditionally used. However, this method has an aspect of increasing an absorption rate. Therefore, a technology for preparing superabsorbent polymers exhibiting improved absorbency and a rapid absorption rate at the same time has been continuously developed.

SUMMARY OF THE INVENTION

Technical Problem

Accordingly, the present disclosure is to provide a method of preparing a superabsorbent polymer, the method capable of minimizing a reduction in absorbency under load while improving a water retention capacity by controlling internal crosslinking density through an additional heat treatment process after forming a surface-crosslinked layer.

Further, the present disclosure is to provide a superabsorbent polymer exhibiting more excellent overall physical properties, which is prepared by the above preparation method.

Technical Solution

To achieve the above object, the present disclosure provides a method of preparing a superabsorbent polymer, the method including the following steps of:

forming a water-containing gel polymer by performing crosslinking polymerization of water-soluble ethylenically unsaturated monomers having acidic groups, of which at least part is neutralized, in the presence of an internal crosslinking agent including a compound represented by the following Chemical Formula 1, an encapsulated foaming agent, and a polymerization initiator;

forming a base polymer in the form of powder by drying and pulverizing the water-containing gel polymer; and performing heat-treatment of the base polymer, wherein the encapsulated foaming agent is used in an amount of 0.1 part by weight to 0.4 parts by weight with respect to 100 parts by weight of the water-soluble ethylenically unsaturated monomers:

[Chemical Formula 1]

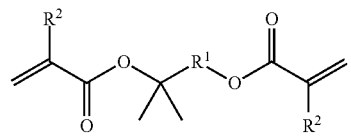

in Chemical Formula 1, $R^1$ is a divalent organic group derived from alkane having 1 to 10 carbon atoms, and $R^2$ is hydrogen or a methyl group.

Further, the present disclosure provides a superabsorbent polymer prepared by the above-described method, the superabsorbent polymer having a centrifuge retention capacity (CRC) of 40 g/g to 55 g/g, as measured according to EDANA method WSP 241.3, and an absorption rate of 48 sec or less, as measured by a vortex method.

Advantageous Effects

According to a method of preparing a superabsorbent polymer according to the present disclosure, a superabsorbent polymer having a rapid absorption rate and an improved water retention capacity may be prepared through additional heat treatment while using both a thermally degradable internal crosslinking agent and an encapsulated foaming agent during polymerization.

DETAILED DESCRIPTION OF THE EMBODIMENTS

The present disclosure may be variously modified and have various forms, and specific embodiments will be illustrated and described in detail as follows. However, it is not intended to limit the present disclosure to the particular forms disclosed and it must be understood that the present disclosure includes every modifications, equivalents, or replacements included in the spirit and technical scope of the present disclosure.

Hereinafter, a method of preparing a superabsorbent polymer according to specific embodiments of the present disclosure will be described in more detail.

First, the terminology used herein is for the purpose of describing particular embodiments only and is not intended to be limiting of the invention. The singular forms used herein are intended to include plural forms as well, unless the context clearly indicates otherwise.

According to one embodiment of the present disclosure, provided is a method of preparing a superabsorbent polymer, the method including the steps of: forming a water-containing gel polymer by performing crosslinking polymerization of water-soluble ethylenically unsaturated monomers having acidic groups, of which at least part is neutralized, in the presence of an internal crosslinking agent including a compound represented by the following Chemical Formula 1, an encapsulated foaming agent, and a polymerization initiator; forming a base polymer in the form of powder by drying and pulverizing the water-containing gel polymer; and performing heat treatment of the base polymer, wherein the encapsulated foaming agent is used in an amount of 0.1 part by weight to 0.4 parts by weight with respect to 100 parts by weight of the water-soluble ethylenically unsaturated monomer:

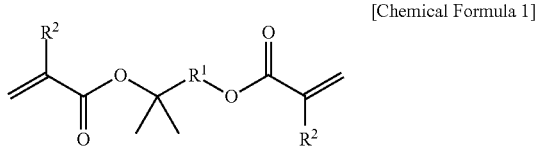

[Chemical Formula 1]

in Chemical Formula 1, $R^1$ is a divalent organic group derived from alkane having 1 to 10 carbon atoms, and $R^2$ is hydrogen or a methyl group.

As used herein, the term "polymer" means a polymerized state of water-soluble ethylenically unsaturated monomers, and may encompass those of all water content ranges or particle size ranges. Among the polymers, those having a water content (a moisture content) of about 40% by weight or more after being polymerized and before being dried may be designated as a water-containing gel polymer.

Further, the "superabsorbent polymer" means the polymer or base polymer itself depending on the context, or is used to encompass those made suitable for commercialization by an additional process of the polymer or the base polymer, for example, surface crosslinking, reassembling of fine particles, drying, pulverizing, size-sorting, etc.

Traditionally, in order to improve absorption properties, a method of introducing pores into the inside of a superabsorbent polymer using a foaming agent during polymerization of the superabsorbent polymer has been known. However, in this method, the pores introduced by the foaming agent are not uniformly distributed throughout the superabsorbent polymer, and therefore, there has been a limitation in improving the absorption properties of the superabsorbent polymer.

Accordingly, the present inventors have found that when a thermally degradable encapsulated foaming agent and a thermally degradable internal crosslinking agent are used at the same time during polymerization of a superabsorbent polymer, a pore structure may be introduced into the superabsorbent polymer, and a crosslinked structure derived from the thermally degradable internal crosslinking agent is partially destroyed through a subsequent heat treatment, thereby remarkably improving a water retention capacity and an absorption rate of the superabsorbent polymer, as compared with those prepared by using no encapsulated foaming agent or by using the encapsulated foaming agent together with another internal crosslinking agent, leading to the present disclosure.

Specifically, the compound represented by Chemical Formula 1, used in the present disclosure, is a thermally degradable internal crosslinking agent which is degradable by heating. In other words, when water-soluble ethylenically unsaturated monomers are polymerized in the presence of the thermally degradable encapsulated foaming agent and the thermally degradable internal crosslinking agent, it is possible to prepare a superabsorbent polymer having increased surface area according to the introduced pore structure and having an external crosslinking density higher than an internal crosslinking density due to at least partial degradation of the crosslinked structure derived from the compound of Chemical Formula 1 in the crosslinked polymer.

Furthermore, a difference between the internal and external crosslinking densities may be easily controlled by varying time and temperature conditions of the additional heat treatment process, and thus it is possible to efficiently prepare a superabsorbent polymer having desired water retention capacity and absorbency.

Accordingly, the superabsorbent polymer prepared according to the method of preparing a superabsorbent polymer of one embodiment may be preferably applied to sanitary products such as diapers, sanitary pads, etc.

Hereinafter, each step of the method of preparing a superabsorbent polymer of one embodiment will be described in more detail.

In the method of preparing a superabsorbent polymer of one embodiment, the step of forming a water-containing gel polymer by performing crosslinking polymerization of water-soluble ethylenically unsaturated monomers having acidic groups, of which at least part is neutralized, in the presence of an internal crosslinking agent including a compound represented by the following Chemical Formula 1, an encapsulated foaming agent, and a polymerization initiator is performed.

The above step is a step of forming a water-containing gel polymer by polymerizing a plurality of water-soluble ethylenically unsaturated monomers using the internal crosslinking agent including the compound represented by Chemical Formula 1, together with the encapsulated foaming agent, and the water-containing gel polymer has a structure which is crosslinked by a vinyl group which is a crosslinkable group of the compound represented by Chemical Formula 1, specifically, a thermally degradable internal crosslinking structure and a pore structure by the foaming agent.

Further, the above step may be performed by steps of preparing a monomer composition including the internal crosslinking agent including the compound represented by Chemical Formula 1, the encapsulated foaming agent, the polymerization initiator, and the water-soluble ethylenically unsaturated monomers having acidic groups, of which at least part is neutralized; and forming the water-containing gel polymer by thermal polymerization or photo-polymerization of the monomer composition.

As used herein, the term 'water-soluble ethylenically unsaturated monomers having acidic groups, of which at least part is neutralized' means that monomers having acidic groups are included in the water-soluble ethylenically unsaturated monomers, in which at least part of the acidic groups of the monomers having acidic groups is neutralized.

In particular, the water-soluble ethylenically unsaturated monomers may be composed of monomers (salts of anionic monomers) in which acidic groups included in the anionic monomer are at least partially neutralized.

As the water-soluble ethylenically unsaturated monomer, an acrylic acid-based monomer may be used, and more specifically, the acrylic acid-based monomer may be a compound represented by the following Chemical Formula 2:

R—COOM$^1$ [Chemical Formula 2]

in Chemical Formula 2,

R is an alkyl group containing an unsaturated bond and having 2 to 5 carbon atoms, and M$^1$ is a hydrogen atom, a monovalent or divalent metal, an ammonium group, or an organic amine salt.

Preferably, the acrylic acid-based monomer may be one or more selected from the group consisting of acrylic acid, methacrylic acid, and a monovalent metal salt thereof, a divalent metal salt thereof, an ammonium salt thereof, and an organic amine salt thereof.

Here, the acrylic acid-based monomer may have acidic groups, of which at least part is neutralized. Preferably, those partially neutralized with an alkali substance such as sodium hydroxide, potassium hydroxide, ammonium hydroxide, etc. may be used as the monomer. In this regard, a degree of neutralization of the acrylic acid-based monomer may be controlled to less than 70 mol %, or 40 mol % to 69 mol %, or 50 mol % to 65 mol %.

However, an excessively high degree of neutralization renders the neutralized monomers precipitated, and thus polymerization may not occur readily. Furthermore, the effect of additional neutralization after initiation of the surface crosslinking is substantially lost, such that the crosslinking degree of the surface-crosslinked layer may not be optimized, and the liquid permeability of the superabsorbent polymer may be insufficient. On the contrary, an excessively low degree of neutralization not only greatly deteriorates absorbency of the polymer but also endows the polymer with hard-to-handle properties, such as of elastic rubber.

In the monomer composition including the water-soluble ethylenically unsaturated monomers, a concentration of the water-soluble ethylenically unsaturated monomer may be about 20% by weight to about 60% by weight, or about 25% by weight to about 50% by weight with respect to the total weight of the monomer composition including respective raw materials described later, the polymerization initiator, a solvent, or optionally, a neutralizing agent such as caustic soda, etc., and the concentration may be appropriately controlled taking into consideration a polymerization time, reaction conditions, etc. However, if the monomer concentration is too low, the yield of the superabsorbent polymer may become low and an economic problem may occur. On the contrary, if the concentration is too high, there is a process problem that a part of the monomers is precipitated, or pulverization efficiency is lowered upon pulverization of the polymerized water-containing gel polymer, and the physical properties of the superabsorbent polymer may be deteriorated.

Further, as used herein, the term 'internal crosslinking agent' is used to distinguish it from a surface crosslinking agent which crosslinks only the surface of the base polymer, described later, and is a crosslinking agent for introducing a thermally degradable internal crosslinking structure into the crosslinked polymer of the water-soluble ethylenically unsaturated monomer.

In Chemical Formula 1, R$^1$ is a divalent organic group derived from alkane having 1 to 10 carbon atoms, as defined above, and R$^2$ is hydrogen or a methyl group. In this regard, the alkane may be linear, branched, or cyclic alkane, and the divalent organic group derived from alkane may be a divalent organic group, in which two hydrogens are removed from one carbon, or a divalent organic group, in which one hydrogen is removed from each of different carbon atoms. Specifically, R$^1$ may be methane-1,1-diyl, ethane-1,2-diyl, ethane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl, 2-methylbutane-2,3-diyl, 3-methylbutane-1,1-diyl, 3-methylbutane-1,2-diyl, 3-methylbutane-1,3-diyl, or 3-methylbutane-2,3-diyl.

Among them, R$^1$ in Chemical Formula 1 may be methane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl, 2-methylbutane-2,3-diyl, 3-methylbutane-1,2-diyl, or 3-methylbutane-1,3-diyl.

Specifically, R$^1$ in Chemical Formula 1 may be methane-1,1-diyl, propane-1,3-diyl, propane-1,2-diyl, or 3-methylbutane-1,3-diyl. More specifically, R$^1$ in Chemical Formula 1 may be 3-methylbutane-1,3-diyl.

The compound, in which R$^1$ in Chemical Formula 1 is the above-listed divalent organic group, may provide an internal crosslinking structure, of which degradability is easily controlled by heat energy, and may not produce by-products or water-soluble components that change the overall physical properties of the superabsorbent polymer after degradation.

The internal crosslinking agent may further include an existing internal crosslinking agent known in the art to which the present disclosure pertains, in addition to the compound represented by Chemical Formula 1. Such an existing internal crosslinking agent may be a compound including two or more crosslinkable functional groups in the molecule. The existing internal crosslinking agent may include a carbon-carbon double bond as the crosslinkable functional group for smooth crosslinking polymerization reaction of the above-described water-soluble ethylenically unsaturated monomer. Specifically, the existing internal crosslinking agent may include one or more selected from the group consisting of polyethylene glycol diacrylate (PEGDA), glycerin diacrylate, glycerin triacrylate, unmodified or ethoxylated trimethylolpropane triacrylate (TMPTA), hexanediol diacrylate, allyl (meth)acrylate, and triethylene glycol diacrylate.

The internal crosslinking agent may include 1% by weight to 100% by weight or 50% by weight to 100% by weight of the compound of Chemical Formula 1 and the remaining amount of the existing internal crosslinking agent with respect to the total weight of the internal crosslinking agent, such that the superabsorbent polymer has a desired level of a crosslinking density gradient. However, in terms of providing a superabsorbent polymer having improved water retention capacity and absorbency under load at the same time, the compound of Chemical Formula 1 may be used as the internal crosslinking agent. In other words, the internal crosslinking agent may include 100% by weight of the compound of Chemical Formula 1 with respect to the total weight.

The internal crosslinking agent may be used in an amount of 0.1 part by weight to 0.6 parts by weight with respect to 100 parts by weight of the water-soluble ethylenically unsaturated monomer. For example, the internal crosslinking agent may be used in an amount of 0.1 part by weight or more, or 0.15 parts by weight or more, and 0.6 parts by weight or less, 0.5 parts by weight or less, or 0.4 parts by weight or less with respect to 100 parts by weight of the water-soluble ethylenically unsaturated monomer. When the internal crosslinking agent is used in an excessively small amount, sufficient degradation of the internal crosslinking structure does not occur, and thus it is difficult to achieve desired absorbency, and when the internal crosslinking agent is used in an excessively large amount, it is not desirable in terms of cost.

In this regard, the content of the water-soluble ethylenically unsaturated monomer is based on the weight of the water-soluble ethylenically unsaturated monomer before neutralization of the acidic groups of the monomers having acidic groups included in the water-soluble ethylenically unsaturated monomer. For example, when the water-soluble ethylenically unsaturated monomer includes acrylic acid, the content of the internal crosslinking agent may be controlled, based on the weight of the monomer before neutralization of acrylic acid.

Further, the encapsulated foaming agent refers to a thermally expandable microcapsule foaming agent having a core-shell structure, and specifically, the encapsulated foaming agent has a core-shell structure, in which a core contains a hydrocarbon and a shell composed of a thermoplastic resin is formed on the core. More specifically, the hydrocarbon constituting the core is a liquid hydrocarbon having a low boiling point which is readily vaporized by heating. Therefore, when heat or energy corresponding thereto (e.g., light energy such as UV, etc.) is applied to the encapsulated foaming agent, the thermoplastic resin constituting the shell softens, and at the same time, the liquid hydrocarbon of the core is vaporized and thus the encapsulated foaming agent expands, as the pressure inside the capsule increases. As a result, bubbles having a larger size than the existing size are generated.

Therefore, the encapsulated foaming agent generates hydrocarbon gas of the core, and it is distinct from an organic foaming agent, which generates nitrogen gas by an exothermic decomposition reaction between monomers participating in the production of a polymer, and an inorganic foaming agent, which generates carbon dioxide gas by absorbing heat generated during the production of a polymer.

Such an encapsulated foaming agent may have expansion properties which may vary depending on components constituting the core and the shell, weights of the respective components, particle sizes thereof. By adjusting these factors, it is possible to expand pores to a desired size and to control porosity of the superabsorbent polymer.

Further, in order to examine whether pores with a desired size are generated by using the encapsulated foaming agent, it is necessary to examine expansion properties of the encapsulated foaming agent. However, the foamed shape of the encapsulated foaming agent inside the superabsorbent polymer is difficult to define as one shape, because it may vary depending on the preparation conditions of the superabsorbent polymer. Therefore, the encapsulated foaming agent is first foamed in air, and then its expansion ratio and size are examined, thereby determining whether it is suitable for forming desired pores.

In detail, the encapsulated foaming agent is applied on a glass petri dish, which is then heated in air at 150° C. for 10 minutes to expand the encapsulated foaming agent. In this regard, when the encapsulated foaming agent exhibits a maximum expansion ratio of 3 times to 15 times, 5 times to 15 times, or 8.5 times to 10 times in air, it may be determined as being suitable for forming an appropriate pore structure in the superabsorbent polymer.

Further, the encapsulated foaming agent may exhibit a maximum expansion size of 20 μm to 190 μm, or 50 μm to 190 μm, or 70 μm to 190 μm, or μm 75 to 190 μm in air. In the above-described range, the prepared superabsorbent polymer may be provided with a pore structure suitable for the rapid absorption rate and improved water retention capacity.

The maximum expansion ratio and the maximum expansion diameter in air of the encapsulated foaming agent will be described in more detail in Preparation Examples below.

Further, the encapsulated foaming agent may be a particle having a mean diameter of 5 μm to 50 μm before expansion. For example, the mean diameter of the encapsulated foaming agent before expanding may be 5 μm to 30 μm, or 5 μm to 20 μm, or 7 μm to 17 μm, or 10 μm to 16 μm, and the capsule thickness of the encapsulated foaming agent may be 2 μm to 15 μm. When the encapsulated foaming agent exhibits the above mean diameter before expanding, it is determined as being suitable for achieving an appropriate pore structure in the polymer. The mean diameter may be determined by measuring a diameter of each particle of the encapsulated foaming agent as a mean Feret' diameter, and then calculating a mean value thereof.

The hydrocarbon constituting the core of the encapsulated foaming agent may be one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane. Among them, hydrocarbons having 3 to 5 carbon atoms (n-propane, n-butane, iso-butane, cyclobutane, n-pentane, iso-pentane, cyclopentane) may be suitable for forming the above-described size of pores, and iso-butane may be the most suitable.

The thermoplastic resin constituting the shell of the encapsulated foaming agent may be a polymer formed from one or more monomers selected from the group consisting of (meth)acrylate, (meth)acrylonitrile, aromatic vinyl, vinyl acetate, vinyl halide, and vinylidene halide. Among them, a copolymer of (meth)acrylate and (meth)acrylonitrile may be the most suitable for forming the above-described size of pores.

Further, a foaming start temperature ($T_{start}$) of the encapsulated foaming agent may be 60° C. to 120° C., or 65° C. to 120° C., or 70° C. to 80° C., and a maximum foaming temperature ($T_{max}$) may be 100° C. to 150° C., or 105° C. to 135° C., or 110° C. to 120° C. Within the above-described range, foaming readily occurs in the subsequent thermal polymerization or drying process, thereby introducing the pore structure into the polymer. The foaming start temperature and the maximum foaming temperature may be measured by using a thermomechanical analyzer.

The encapsulated foaming agent may include the core composed of hydrocarbon in an amount of 10% by weight to 30% by weight with respect to the total weight of the encapsulated foaming agent. This range may be most suitable for forming the pore structure of the superabsorbent polymer. As the encapsulated foaming agent, a directly prepared encapsulated foaming agent may be used, or a commercially available foaming agent satisfying the above-described conditions may be used.

Further, the encapsulated foaming agent may be used in an amount of 0.1 part by weight to 0.4 parts by weight with respect to 100 parts by weight of the water-soluble ethylenically unsaturated monomer. If the amount of the encapsulated foaming agent is too small, sufficient foaming does not occur, and thus the pore structure may not be properly formed in the polymer, which does not contribute to increasing the absorption rate. If the amount of the encapsulated foaming agent is too large, porosity of the polymer may be too high, and as a result, strength of the superabsorbent polymer may be weakened or an excessive amount of fine particles may be generated during processing. In this respect, the encapsulated foaming agent may be preferably used in the above range of content. For example, the encapsulated foaming agent may be used in an amount of 0.3 parts by weight to 0.4 parts by weight with respect to 100 parts by weight of the water-soluble ethylenically unsaturated monomer.

In this regard, the content of the water-soluble ethylenically unsaturated monomer is based on the weight of the water-soluble ethylenically unsaturated monomer before neutralization of the acidic groups of the monomers having acidic groups included in the water-soluble ethylenically unsaturated monomer. For example, when the water-soluble ethylenically unsaturated monomer includes acrylic acid, the content of the internal crosslinking agent may be controlled, based on the weight of the monomer before neutralization of acrylic acid.

Further, the polymerization initiator used in polymerizing the ethylenically unsaturated monomers may be appropriately selected depending on a polymerization method. When a thermal polymerization method is employed, a thermal polymerization initiator is used. When a photo-polymerization method is employed, a photo-polymerization initiator is used. When a hybrid polymerization method (a method of using both heat and light) is employed, both the thermal polymerization initiator and the photo-polymerization initiator may be used. However, even in the case of the photo-polymerization method, a certain amount of heat is generated by light irradiation such as ultraviolet irradiation, etc., and a certain amount of heat is generated according to the progression of the polymerization reaction, which is an exothermic reaction, and therefore, the thermal polymerization initiator may be additionally used.

The photo-polymerization initiator may be used without limitation in view of constitution as long as it is a compound capable of forming a radical by light such as ultraviolet rays.

The photo-polymerization initiator may include, for example, one or more selected from the group consisting of benzoin ether, dialkyl acetophenone, hydroxyl alkylketone, phenyl glyoxylate, benzyl dimethyl ketal, acyl phosphine, and α-aminoketone. Meanwhile, specific examples of the acyl phosphine may include diphenyl(2,4,6-trimethylbenzoyl)phosphine oxide, phenylbis(2,4,6-trimethylbenzoyl) phosphine oxide, ethyl(2,4,6-trimethylbenzoyl)phenylphosphinate, etc. More various photo-polymerization initiators are well disclosed in "UV Coatings: Basics, Recent Developments and New Application (Elsevier, 2007)" written by Reinhold Schwalm, p 115, however, the photo-polymerization initiator is not limited to the above-described examples.

The photo-polymerization initiator may be included at a concentration of about 0.0001% by weight to about 2.0% by weight with respect to the monomer composition. When the concentration of the photo-polymerization initiator is too low, the polymerization rate may become slow, and when the concentration of the photo-polymerization initiator is too high, a molecular weight of the superabsorbent polymer becomes small and its physical properties may become uneven.

Further, as the thermal polymerization initiator, one or more selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), etc., and examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), etc. More various thermal polymerization initiators are well disclosed in 'Principle of Polymerization (Wiley, 1981)' written by Odian, p 203, however, the thermal polymerization initiator is not limited to the above-described examples.

The thermal polymerization initiator may be included at a concentration of about 0.001% by weight to about 2.0% by weight with respect to the monomer composition. If the concentration of the thermal polymerization initiator is too low, additional thermal polymerization hardly occurs, and thus the addition effect of the thermal polymerization initiator may be insignificant. If the concentration of the thermal polymerization initiator is too high, the molecular weight of the superabsorbent polymer may become low and its physical properties may become uneven.

The monomer composition may further include an additive such as a thickener, a plasticizer, a preservation stabilizer, an antioxidant, etc., if necessary.

The above-described raw materials such as the water-soluble ethylenically unsaturated monomer, internal crosslinking agent, encapsulated foaming agent, polymerization initiator, and additives may be in the form of being dissolved in the solvent.

As the solvent to be applicable, any solvent may be used without limitations in view of constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

The solvent may be included in the remaining amount excluding the above-described components, with respect to the total amount of the monomer composition.

The monomer composition may be prepared by dissolving the above-described raw materials, such as the water-soluble ethylenically unsaturated monomer, internal crosslinking agent, encapsulated foaming agent, polymerization initiator, and additives, in the solvent using a mixing method generally known.

Meanwhile, the method of forming the water-containing gel polymer by thermal polymerization, photo-polymerization, or hybrid polymerization of the monomer composition is also not particularly limited in view of constitution, as long as it is a polymerization method commonly used.

Specifically, the polymerization method is largely classified into thermal polymerization and photo-polymerization according to a polymerization energy source. In the case of thermal polymerization, it may be commonly carried out in a reactor like a kneader equipped with agitating spindles. The thermal polymerization may be carried out at a temperature of about 80° C. or higher and lower than about 110° C. such that the compound represented by Chemical Formula 1 is not degraded by heating. A means for raising the polymerization temperature in the above-descried range is not particularly limited. Heating may be performed by providing a heating medium or by directly providing a heat source for the reactor. The kind of the applicable heating medium may be a hot fluid, etc., such as steam, hot air, or hot oil, but is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but the present disclosure is not limited to these examples.

Meanwhile, when the photo-polymerization is carried out, it may be carried out in a reactor equipped with a movable conveyor belt, but the above-described polymerization method is an example only, and the present disclosure is not limited to the above-described polymerization methods. For example, when thermal polymerization is carried out by providing a hot medium to the reactor like a kneader equipped with the agitating spindles or by heating the reactor, as described above, the water-containing gel polymer discharged from an outlet of the reactor may be obtained. The water-containing gel polymer thus obtained may have a size of centimeters or millimeters, according to the type of agitating spindles equipped in the reactor. Specifically, the size of the obtained water-containing gel polymer may vary depending on a concentration of the monomer composition fed thereto, a feeding speed or the like.

Further, as described above, when the photo-polymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer composition fed thereto and the feeding speed, and usually, it is preferable to supply the monomer composition such that a sheet-like polymer having a thickness of about 0.5 cm to about 10 cm may be obtained. When the monomer composition is supplied to such an extent that the thickness of the sheet-like polymer becomes too thin, it is undesirable because the production efficiency is low, and when the thickness of the sheet-like polymer is more than 10 cm, the polymerization reaction may not evenly occur over the entire thickness because of the excessive thickness.

The polymerization time of the monomer composition is not particularly limited, but may be controlled to about 30 sec to 60 min.

The water-containing gel polymer obtained by the above-mentioned method may generally have a water content of about 30% by weight to about 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the following drying conditions: the temperature is increased from room temperature to about 180° C. and then the temperature is maintained at 180° C., and the total drying time is set to 40 minutes, including 5 minutes for the temperature rising step.

Next, the step of forming the base polymer in the form of powder by drying and pulverizing the water-containing gel polymer is performed. By heating during the drying process, in the base polymer prepared in the above step, at least part of the internal crosslinking structure crosslinked by the compound represented by Chemical Formula 1 is destroyed and an additional pore structure may be formed by a portion of the foaming agent that remains unfoamed. As described, the base polymer, in which the internal crosslinking density is decreased and the surface area is increased by the pore structure, may have remarkably improved water retention capacity and absorption rate, as compared with a base polymer in which the internal crosslinking density is not decreased or the pore structure is not formed.

Meanwhile, the step of forming the base polymer may include a process of coarsely pulverizing the water-containing gel polymer before drying the water-containing gel polymer, in order to increase the drying efficiency.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

Through the coarse pulverization step, the particle diameter of the water-containing gel polymer may be controlled to about 0.1 mm to about 10 mm. Pulverization to a particle diameter of less than 0.1 mm is not technically easy due to the high water content of the water-containing gel polymer, and an agglomeration phenomenon between the pulverized particles may occur. Meanwhile, if the polymer is pulverized to a particle diameter of larger than 10 mm, the effect of increasing the efficiency in the subsequent drying step may be insignificant.

The water-containing gel polymer coarsely pulverized as above or the water-containing gel polymer immediately after polymerization without the coarse pulverizing process is subjected to a drying step. In this regard, the drying temperature may be about 20° C. to about 250° C. If the drying temperature is too low, the drying time becomes too long and the physical properties of the superabsorbent polymer finally formed may be deteriorated. If the drying temperature is too high, only the polymer surface is excessively dried, and thus fine particles may be generated during the subsequent pulverization process and the physical properties of the superabsorbent polymer finally formed may be deteriorated. Therefore, the drying may be preferably performed at a temperature of about 40° C. to about 240° C., and more preferably at a temperature of about 110° C. to about 220° C.

Meanwhile, the drying time may be about 20 min to about 12 hr, in consideration of the process efficiency. For example, the drying may be performed for about 10 min to about 100 min or for about 20 min to about 40 min.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation, ultraviolet irradiation, etc. When the drying step as above is finished, the water content of the polymer may be about 0.1% by weight to about 10% by weight.

Thereafter, the dried polymer obtained through the drying step is pulverized using a pulverizer.

Specifically, the pulverizer which is used to pulverize the base polymer of the powder form such that it is composed of particles having a particle size of about 150 µm to about 850 µm may include a pin mill, a hammer mill, a screw mill, a roll mill, a disc mill, a jog mill, etc., but the present disclosure is not limited to the above-descried examples.

Further, the step of size-sorting the prepared base polymer after the pulverizing step may be further included.

The base polymer of the powder form is size-sorted according to the particle size, and physical properties of the superabsorbent polymer to be finally commercialized may be managed. Through these pulverizing and size-sorting processes, the obtained superabsorbent polymer may be suitably prepared and provided such that it has a particle diameter of about 150 µm to about 850 µm. More specifically, at least about 90% by weight or more, preferably about 95% by weight or more of the base polymer has a particle size of about 150 µm to about 850 µm, and the content of fine particles having a particle size of less than about 150 µm may be less than about 3% by weight.

As described, as the particle size distribution of the superabsorbent polymer is controlled within the preferred range, the superabsorbent polymer finally prepared may exhibit excellent overall physical properties. Therefore, in the size-sorting step, the polymer having a particle size of about 150 µm to about 850 µm may be sorted, and only the polymer powder having the above particle size may be additionally heat-treated, and then commercialized.

Optionally, the step of forming a surface-crosslinked layer by additionally crosslinking the surface of the base polymer in the presence of a surface crosslinking agent may be further included, before the step of performing heat treatment after the step of forming the base polymer.

The above step is to prepare the base polymer, on which the surface-crosslinked layer is formed, using the surface crosslinking agent, in order to increase the surface crosslinking density of the base polymer. The water-soluble ethylenically unsaturated monomers, which remain uncrosslinked on the surface, may be crosslinked by the surface crosslinking agent, and as a result, the base polymer having the increased surface crosslinking density may be formed. Through this heat treatment process, the surface crosslinking density, i.e., the external crosslinking density may be increased, whereas the internal crosslinking density may be further decreased because at least part of the region crosslinked by the compound represented by Chemical Formula 1 is degraded. Therefore, the base polymer in which the surface-crosslinked layer is formed may have a structure in which the crosslinking density increases from inside to outside.

As the surface crosslinking agent, surface crosslinking agents which have been used in the preparation of the superabsorbent polymer may be used without particular limitation. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more carbonate-based compounds selected from the group consisting of ethylene carbonate and propylene carbonate; epoxy compounds such as ethylene glycol diglycidyl ether, etc.; oxazoline compounds such as oxazolidinone, etc.; polyamine compounds; oxazoline compounds; mono-, di-, or polyoxazolidinone compounds; or cyclic urea compounds, etc.

Such a surface crosslinking agent may be used in an amount of about 0.01 part by weight to about 3 parts by weight, about 0.05 parts by weight to about 2 parts by weight, or about 0.5 parts by weight to about 1 part by weight with respect to 100 parts by weight of the base polymer. By controlling the content range of the surface crosslinking agent within the above-described range, a superabsorbent polymer exhibiting excellent overall absorption properties may be provided.

As the surface crosslinking agent, one or more inorganic materials selected from the group consisting of silica, clay, alumina, silica-alumina composite, titania, zinc oxide, and aluminum sulfate may be further included to conduct a surface crosslinking reaction. The inorganic material may be used in the form of powder or liquid, and particularly, in the form of alumina powder, silica-alumina powder, titania powder, or a nanosilica solution. Further, the inorganic material may be used in an amount of about 0.001 part by weight to about 2 parts by weight with respect to 100 parts by weight of the base polymer.

Further, a method of mixing the surface crosslinking agent with the base polymer is not limited in view of its construction. For example, a method of feeding the surface crosslinking agent and the base polymer to a reactor and mixing them with each other, a method of spraying the surface crosslinking agent onto the base polymer, or a method of mixing the base polymer and the surface crosslinking agent while continuously feeding them to a mixer which is continuously operated may be used.

When the surface crosslinking agent and the base polymer are mixed, water and methanol may be mixed together and added. When water and methanol are added, there is an advantage in that the surface crosslinking agent may be uniformly dispersed in the base polymer. Here, the amounts of water and methanol to be added may be appropriately controlled so as to induce uniform dispersion of the surface crosslinking agent, to prevent agglomeration of the base polymer, and to optimize the surface penetration depth of the crosslinking agent at the same time.

The surface crosslinking process may be carried out at a temperature of about 80° C. to about 200° C. More specifically, the surface crosslinking process may be carried out at a temperature of about 100° C. to about 180° C., or about 120° C. to about 160° C. for about 20 min to about 2 hr, or about 40 min to about 80 min. When satisfying the above-described surface crosslinking process conditions, the surface of the base polymer may be sufficiently crosslinked to increase absorbency under load while increasing water retention capacity due to appropriate degradation of the internal structure.

A means for raising temperature for the surface crosslinking reaction is not particularly limited. Heating may be performed by providing a heating medium or by directly providing a heat source. In this regard, the kind of the applicable heating medium may be a hot fluid, etc., such as steam, hot air, or hot oil, but is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but the present disclosure is not limited to the above-described examples.

Next, the step of performing heat treatment of the base polymer or the surface-crosslinked layer-formed base polymer may be performed.

The step is to prepare a superabsorbent polymer having a much larger difference between internal and external crosslinking densities by further degrading the region crosslinked by the compound represented by Chemical Formula 1 by the additional heat treatment of the base polymer. As a result, the finally prepared superabsorbent polymer may have greatly improved water retention capacity while having a small reduction in absorbency under load, thereby exhibiting increased water retention capacity, as compared with a superabsorbent polymer which is not additionally heat-treated. Furthermore, a superabsorbent polymer exhibiting desired absorption performances may be easily prepared by controlling additional heat treatment conditions.

The heat treatment may be performed at a temperature of about 100° C. to about 200° C. for about 5 min to about 90 min. Specifically, the heat treatment temperature may be about 120° C. or higher, about 140° C. or higher, or about 150° C. or higher, and about 200° C. or lower, or about 190° C. or lower, and the heat treatment time may be about 10 min or more, about 15 min or more, or about 20 min or more, and about 90 min or less, about 80 min or less, or about 60 min or less. If the heat treatment temperature is excessively low or the heat treatment time is too short, degradation of the internal crosslinking structure due to additional heat treatment may not sufficiently occur, and if the heat treatment temperature is excessively high or the heat treatment time is too long, water-soluble components in the superabsorbent polymer are increased, which may be problematic.

The heat treatment method is not particularly limited, but it may be, for example, performed by a method such as hot air supply, infrared irradiation, microwave irradiation, ultraviolet irradiation, etc. Preferably, the heat treatment method may be performed using a convection oven capable of shifting airflow up and down.

In the method of preparing the superabsorbent polymer according to one embodiment, the kind and the content of the internal crosslinking agent, the temperature and/or time conditions of the subsequent process of polymerization (drying process or surface crosslinking reaction process), and the temperature and/or time conditions of the additional heat treatment process may be appropriately controlled to provide a superabsorbent polymer exhibiting a desired level of difference between the internal and external crosslinking densities. The superabsorbent polymer may have a crosslinking density gradient with remarkably increasing crosslinking density from inside to outside, thereby having improved centrifuge retention capacity (CRC) and absorbency under load (AUL), as compared with a superabsorbent polymer which is not additionally heat-treated. Further, such a crosslinking density gradient may be easily controlled by the heat treatment process after preparation of a superabsorbent polymer, and thus a superabsorbent polymer having desired absorption properties may be easily prepared.

Meanwhile, the superabsorbent polymer prepared according to the above-described preparation method may include a porous crosslinked polymer which is prepared by crosslinking water-soluble ethylenically unsaturated monomers having at least partially neutralized acidic groups via the compound represented by the Chemical Formula 1, and the superabsorbent polymer may be in the form of powder, of which about 90% by weight or more may have a particle size of 150 μm to 850 μm.

Alternatively, when the surface crosslinking process is additionally performed, the prepared superabsorbent polymer may have the base polymer including a porous crosslinked polymer which is prepared by crosslinking water-soluble ethylenically unsaturated monomers having at least partially neutralized acidic groups via the compound represented by the Chemical Formula 1; and the surface-crosslinked layer which is formed on the base polymer and prepared by additionally crosslinking the crosslinked polymer via the surface crosslinking agent, wherein the superabsorbent polymer may be in the form of powder, of which about 90% by weight or more may have a particle size of 150 μm to 850 μm.

Further, the superabsorbent polymer prepared by the above-described preparation method may have a centrifuge retention capacity (CRC) of 40 g/g to 55 g/g, as measured according to EDANA method WSP 241.3, and an absorption rate of 48 sec or less, as measured by a vortex method. More specifically, the superabsorbent polymer may have a centrifuge retention capacity (CRC) of 41 g/g or more, 43 g/g or more, or 44 g/g or more, and 54 g/g or less, 53 g/g or less, or 52 g/g or less, as measured according to EDANA method WSP 241.3. Further, the superabsorbent polymer may have an absorption rate of 48 sec or less, 45 sec or less, or 40 sec or less, as measured by a vortex method. As a lower limit of the absorption rate is lower, it is more advantageous. Thus, there is no limit in the value, but the absorption rate may be, for example, 10 sec or more, 15 sec or more, or 20 sec or more.

Hereinafter, preferred examples are provided for better understanding of the present disclosure. However, the following Examples are only for illustrating the present disclosure, and the present disclosure is not limited thereto.

Preparation of Encapsulated Foaming Agent

F-36D manufactured by Matsumoto Co., Ltd, in which a core is iso-butane and a shell is a copolymer of acrylate and acrylonitrile, was prepared as an encapsulated foaming agent used in Examples. In this regard, the core was included in an amount of 25% by weight with respect to the total weight of the encapsulated foaming agent, and a foaming start temperature ($T_{start}$) of F-36D was 70° C. to 80° C., and a maximum foaming temperature ($T_{max}$) was 110° C. to 120° C.

A particle diameter of the encapsulated foaming agent was measured as a mean Feret' diameter by an optical microscope. Further, a mean value of the diameters of the encapsulated foaming agents was calculated and determined as a mean diameter of the encapsulated foaming agent.

Further, to confirm the expansion properties of the encapsulated foaming agent, 0.2 g of the prepared encapsulated foaming agent was applied on a glass petri dish, and then left for 10 minutes on a hot plate preheated at 150° C. The encapsulated foaming agent was slowly expanded by heating, which was observed under an optical microscope to measure the maximum expansion ratio and the maximum expansion size of the encapsulated foaming agent in air. The diameters of the particles belonging to the top 10% by weight of the highly expanded particles after heating the encapsulated foaming agent were measured and determined as the maximum expansion size, and a ratio ($D_M/D_0$) of the mean diameter ($D_M$) of particles belonging to the top 10% by weight of the highly expanded particles after heating the encapsulated foaming agent to the mean diameter ($D_0$)

measured before heating the encapsulated foaming agent was calculated and determined as the maximum expansion ratio.

The mean diameter of the prepared encapsulated foaming agent before expanding was 13 μm, and the maximum expansion ratio in air was about 10 times, and the maximum expansion size was about 80 μm to about 150 μm.

EXAMPLE 1

In a glass reactor, 100 g of acrylic acid, 123.5 g of 32 wt % caustic soda (NaOH) solution, 0.2 g of 3-methylbutane-1,3-diyl diacrylate (MBDA) as an internal crosslinking agent, 0.33 g of the prepared encapsulated foaming agent F-36D, 0.2 g of sodium persulfate as a thermal polymerization initiator, and 0.008 g of diphenyl(2,4,6-trimethylbenzoyl)phosphine oxide as a photo-polymerization initiator were added to water, and then mixed using a mechanical mixer at a speed of 500 rpm for about 10 min to prepare a monomer composition having a total solid content of 45.0% by weight.

The monomer composition was fed at a speed of 500 mL/min to 2000 mL/min onto a conveyor belt having a width of 10 cm and a length of 2 m and moving at a speed of 50 cm/min. Further, polymerization reaction was allowed for 60 sec by irradiating UV at a density of 10 mW/cm² while feeding the monomer composition.

Further, a water-containing gel polymer obtained by the polymerization reaction was passed through a hole with a diameter of 10 mm using a meat chopper to prepare crumbs. Then, the crumbs were uniformly dried in a convection oven capable of shifting airflow up and down by flowing hot air at 195° C. from the bottom to the top for 10 minutes and from the top to the bottom for 20 minutes to prepare a base polymer in the form of powder. Thereafter, size-sorting was performed to obtain a base polymer having a size of 150 μm to 850 μm.

The base polymer was heat-treated at a temperature of 185° C. for 30 min in a convection oven capable of shifting airflow up and down to prepare a superabsorbent polymer.

EXAMPLES 2 TO 8 AND COMPARATIVE EXAMPLES 1 TO 8

Each superabsorbent polymer was prepared in the same manner as in Example 1, except that the internal crosslinking agent, the amount of the encapsulated foaming agent, and the heat treatment conditions in Example 1 were changed as in Table 1 below.

EXPERIMENTAL EXAMPLE

Centrifuge retention capacity (CRC), absorption rate, and generation rate of fine particles were evaluated for the superabsorbent polymers prepared in Examples and Comparative Examples by the following methods, and the results are shown in Table 1 below.

(1) Centrifuge Retention Capacity (CRC)

The water retention capacity by absorption capacity under no load was measured for each polymer in accordance with European Disposables and Nonwovens Association standard EDANA WSP 241.3.

In detail, each of the polymers obtained in Examples and Comparative Examples was classified using a sieve of #30-50. After uniformly introducing $W_0$ (g) (about 0.2 g) of the polymer in a nonwoven fabric-made bag and sealing the same, it was immersed in physiological saline (0.9 wt %) at room temperature. After 30 minutes, the bag was dehydrated by using a centrifuge at 250 G for 3 minutes, and then the weight $W_2$ (g) of the bag was measured. Further, after carrying out the same operation without using the polymer, the weight $W_1$ (g) of the bag was measured.

CRC (g/g) was calculated using the obtained weights according to the following Equation 1:

$$CRC(g/g)=\{[W_2(g)-W_1(g)]/W_0(g)\}-1 \quad \text{[Equation 1]}$$

in Equation 1, $W_0(g)$ is an initial weight (g) of the superabsorbent polymer, $W_1(g)$ is a weight of an apparatus without the superabsorbent polymer after immersing in physiological saline for 30 minutes, allowing to absorb, and dehydrating using a centrifuge at 250 G for 3 minutes, and $W_2(g)$ is a weight of the apparatus with the superabsorbent polymer after immersing the superabsorbent polymer in physiological saline at room temperature for 30 minutes, allowing to absorb, and dehydrating using a centrifuge at 250 G for 3 minutes.

(2) Absorption Rate by Vortex Method

The absorption rate of each of the superabsorbent polymers of Examples and Comparative Examples was measured in seconds according to the method described in International Publication WO 1987-003208.

In detail, 2 g of the superabsorbent polymer was added to 50 mL of physiological saline at 23° C. to 24° C., and stirred with a magnetic bar (diameter of 8 mm and length of 31.8 mm) at 600 rpm, and a time taken for vortex to disappear was measured in seconds to calculate the absorption rate (vortex time).

(3) Fine Particle Generation Rate

Fine particle generation rate of each of the superabsorbent polymers of Examples and Comparative Examples was calculated as a ratio of the weight of the polymer having a particle size of less than 100 μm with respect to the weight of the base polymer initially fed into the size-sorter at the time of size-sorting the pulverized base polymer in the form of powder.

TABLE 1

|  | Internal crosslinking agent (content) | Encapsulated foaming agent (content) | Heat treatment conditions | | Physical properties of superabsorbent polymer | | Generation rate of fine particles (%) |
|---|---|---|---|---|---|---|---|
|  |  |  | Temperature (° C.) | Time (min) | CRC (g/g) | Absorption rate (sec) |  |
| Example 1 | MBDA (0.2) | F-36D (0.33) | 185 | 30 | 44.8 | 32 | 28.4 |
| Example 2 | MBDA (0.2) | F-36D (0.33) | 185 | 60 | 50.3 | 35 | — |

TABLE 1-continued

| | Internal crosslinking agent (content) | Encapsulated foaming agent (content) | Heat treatment conditions | | Physical properties of superabsorbent polymer | | Generation rate of fine particles (%) |
|---|---|---|---|---|---|---|---|
| | | | Temperature (° C.) | Time (min) | CRC (g/g) | Absorption rate (sec) | |
| Example 3 | MBDA (0.2) | F-36D (0.1) | 185 | 30 | 46.1 | 45 | — |
| Example 4 | MBDA (0.2) | F-36D (0.1) | 185 | 60 | 50.1 | 48 | — |
| Example 5 | MBDA (0.2) | F-36D (0.2) | 185 | 30 | 45.3 | 40 | — |
| Example 6 | MBDA (0.2) | F-36D (0.2) | 185 | 60 | 49.5 | 42 | — |
| Example 7 | MBDA (0.2) | F-36D (0.4) | 185 | 30 | 44.8 | 27 | — |
| Example 8 | MBDA (0.2) | F-36D (0.4) | 185 | 60 | 51.2 | 30 | — |
| Comparative Example 1 | MBDA (0.2) | F-36D (0.33) | No heat treatment | | 39.6 | 30 | — |
| Comparative Example 2 | PEGDA (0.2) | F-36D (0.33) | No heat treatment | | 37.6 | 32 | — |
| Comparative Example 3 | PEGDA (0.2) | F-36D (0.33) | 185 | 30 | 37.0 | 36 | — |
| Comparative Example 4 | PEGDA (0.2) | F-36D (0.33) | 185 | 60 | 37.5 | 41 | — |
| Comparative Example 5 | MBDA (0.2) | F-36D (0.03) | 185 | 60 | 51.1 | 52 | — |
| Comparative Example 6 | MBDA (0.2) | F-36D (2.0) | No heat treatment | | — | — | 39.0 |
| Comparative Example 7 | MBDA (0.2) | None | 185 | 30 | 45.4 | 57 | — |
| Comparative Example 8 | MBDA (0.2) | None | 185 | 60 | 50.8 | 61 | — |

In Table 1, the contents of the internal crosslinking agent and the encapsulated foaming agent represent parts by weight with respect to 100 parts by weight of acrylic acid, and '-' represents 'not measured'.

Referring to Table 1, the superabsorbent polymers of Examples exhibited remarkably improved water retention capacity and absorption rate, as compared with the superabsorbent polymers of Comparative Examples 3 and 4, in which the internal crosslinking agent represented by Chemical Formula 1 was not used, even though the encapsulated foaming agent was used. Further, the superabsorbent polymers of Examples exhibited excellent water retention capacity, as compared with the superabsorbent polymer of Comparative Example 1, in which additional heat treatment was not performed.

In contrast, unlike the superabsorbent polymers of Examples, the superabsorbent polymers of Comparative Examples 3 and 4, in which the thermally degradable internal crosslinking agent was not used, exhibited no improvement in the water retention capacity, even though additional heat treatment was performed.

Further, unlike the superabsorbent polymers of Examples, the superabsorbent polymers of Comparative Examples 7 and 8, in which the encapsulated foaming agent was not used, or the superabsorbent polymer of Comparative Example 5, in which the encapsulated foaming agent was used in an excessively small amount, exhibited a low absorption rate, and the superabsorbent polymer of Comparative Example 6, in which the encapsulated foaming agent was used in an excessively large amount, exhibited a greatly increased generation rate of fine particles, indicating reduction in the production amount and process stability.

Accordingly, it can be seen that when the thermally degradable internal crosslinking agent is used together with a predetermined amount of the encapsulated foaming agent during polymerization, and additional heat treatment is performed, it is possible to prepare a superabsorbent polymer having a rapid absorption rate and an improved water retention capacity.

The invention claimed is:

1. A method of preparing a superabsorbent polymer, the method comprising:
forming a water-containing gel polymer by performing crosslinking polymerization of water-soluble ethylenically unsaturated monomers having acidic groups, of which at least part is neutralized, in the presence of an internal crosslinking agent including a compound represented by the following Chemical Formula 1, an encapsulated foaming agent, and a polymerization initiator;
forming a base polymer in the form of powder by drying and pulverizing the water-containing gel polymer; and
performing heat-treatment of only the base polymer,
wherein the encapsulated foaming agent is used in an amount of 0.1 part by weight to 0.4 parts by weight with respect to 100 parts by weight of the water-soluble ethylenically unsaturated monomer:

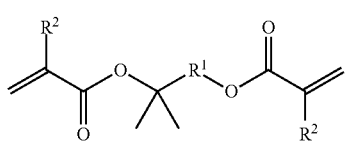

[Chemical Formula 1]

in Chemical Formula 1, $R^1$ is a divalent organic group derived from alkane having 1 to 10 carbon atoms, and $R^2$ is hydrogen or a methyl group.

2. The method of preparing a superabsorbent polymer of claim 1,
wherein the internal crosslinking agent includes the compound of Chemical Formula 1, in which $R^1$ is methane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl, 2-methylbutane-2,3-diyl, 3-methylbutane-1,2-diyl, or 3-methylbutane-1,3-diyl.

3. The method of preparing a superabsorbent polymer of claim 1,
wherein the internal crosslinking agent includes the compound represented by Chemical Formula 1 in an amount of 1% by weight to 100% by weight with respect to a total weight of the internal crosslinking agent.

4. The method of preparing a superabsorbent polymer of claim 1,
wherein the internal crosslinking agent is used in an amount of 0.1 part by weight to 0.6 parts by weight with respect to 100 parts by weight of the water-soluble ethylenically unsaturated monomer.

5. The method of preparing a superabsorbent polymer of claim 1,
wherein the encapsulated foaming agent has a mean diameter of 5 μm to 50 μm before expansion.

6. The method of preparing a superabsorbent polymer of claim 1,
wherein the encapsulated foaming agent has a core-shell structure, in which a core contains a hydrocarbon and a shell composed of a thermoplastic resin is formed on the core.

7. The method of preparing a superabsorbent polymer of claim 6,
wherein the hydrocarbon is one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane.

8. The method of preparing a superabsorbent polymer of claim 6,
wherein the thermoplastic resin is a polymer formed from one or more monomers selected from the group consisting of (meth)acrylate, (meth)acrylonitrile, aromatic vinyl, vinyl acetate, vinyl halide, and vinylidene halide.

9. The method of preparing a superabsorbent polymer of claim 1,
further comprising forming a surface-crosslinked layer by further crosslinking a the surface of the base polymer in the presence of a surface crosslinking agent, before performing heat treatment after forming the base polymer.

10. The method of preparing a superabsorbent polymer of claim 1,
wherein the heat treatment is performed at a temperature of 100° C. to 200° C. for 5 min to 90 min.

11. The method of preparing a superabsorbent polymer of claim 1,
wherein the prepared superabsorbent polymer has a centrifuge retention capacity (CRC) of 40 g/g to 55 g/g, as measured according to EDANA method WSP 241.3, and an absorption rate of 48 sec or less, as measured by a vortex method.

* * * * *